(12) United States Patent
Bellmann et al.

(10) Patent No.: US 8,476,391 B2
(45) Date of Patent: Jul. 2, 2013

(54) ANIONIC WATER-IN-WATER POLYMER DISPERSION, METHOD FOR THE PRODUCTION THEREOF AND ITS USE

(75) Inventors: Susanne Bellmann, Ratingen (DE); Norbert Steiner, Alzenau (DE); Michael Busch, Moenchengladbach (DE); Dev Steuck, Haselau (DE); Johann Schulte, Krefeld (DE); Wolfgang Woebel, Willich (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 1260 days.

(21) Appl. No.: 10/593,293

(22) PCT Filed: Mar. 7, 2005

(86) PCT No.: PCT/EP2005/002358
§ 371 (c)(1),
(2), (4) Date: May 15, 2007

(87) PCT Pub. No.: WO2005/092954
PCT Pub. Date: Oct. 6, 2005

(65) Prior Publication Data
US 2007/0203290 A1    Aug. 30, 2007

(30) Foreign Application Priority Data
Mar. 18, 2004 (DE) .................. 10 2004 013 750

(51) Int. Cl.
C08F 2/00 (2006.01)
C08F 2/16 (2006.01)
C08F 20/06 (2006.01)
C08F 120/06 (2006.01)
C08F 220/06 (2006.01)
C08F 20/10 (2006.01)
C08F 118/02 (2006.01)

(52) U.S. Cl.
USPC ....... 526/317.1; 526/89; 526/123.1; 526/173; 526/201; 526/318; 526/318.3; 526/319

(58) Field of Classification Search
USPC ............. 526/89, 91, 123.1, 173, 201, 317.1, 526/318, 318.3, 319
See application file for complete search history.

(56) References Cited

U.S. PATENT DOCUMENTS

| | | | |
|---|---|---|---|
| 4,929,655 A | 5/1990 | Takeda et al. | |
| 5,006,590 A | 4/1991 | Takeda et al. | |
| 5,340,859 A * | 8/1994 | Aydin et al. | 524/162 |
| 5,403,883 A | 4/1995 | Messner et al. | |
| 5,480,934 A * | 1/1996 | Messner et al. | 524/458 |
| 5,541,252 A | 7/1996 | Schmitt et al. | |
| 5,837,776 A * | 11/1998 | Selvarajan et al. | 525/244 |
| 5,985,992 A * | 11/1999 | Chen | 524/814 |
| 6,265,477 B1* | 7/2001 | Hurlock | 524/458 |
| 6,331,229 B1 | 12/2001 | Wong Shing et al. | |
| 2004/0034145 A1* | 2/2004 | Fischer et al. | 524/457 |

FOREIGN PATENT DOCUMENTS

| | | |
|---|---|---|
| CA | 2 140 817 | 7/1995 |
| DE | 42 16 167 A1 | 11/1993 |
| DE | 43 16 200 A1 | 11/1994 |
| DE | 43 35 567 A1 | 4/1995 |
| DE | 44 01 951 A1 | 7/1995 |
| DE | 100 61 483 A1 | 6/2002 |
| DE | 100 61 483 A1 | 6/2007 |
| EP | 0 630 909 A1 | 12/1994 |
| EP | 0 664 302 | 7/1995 |
| WO | WO 98/14405 | 4/1998 |
| WO | WO 98/31748 | 7/1998 |
| WO | WO 98/31749 | 7/1998 |
| WO | 02/46275 | 6/2002 |

* cited by examiner

Primary Examiner — Karuna P Reddy
(74) Attorney, Agent, or Firm — Oblon, Spivak, McClelland, Maier & Neustadt, L.L.P.

(57) ABSTRACT

The invention relates to a method for producing anionic water-in-water polymer dispersions containing at least one finely dispersed, water-soluble and/or water-swellable polymer A and a continuous aqueous phase. This phase has a partial quantity of at least one polymeric dispersing agent B in which monomers dispersed in this aqueous phase are subjected to a radical polymerization, and after the polymerization is completed, the reaction mixture is subsequently diluted with the remaining amount of dispersing agent B. The invention also relates to the polymer dispersions obtained according to the method and to their use, particularly in the paper industry.

20 Claims, No Drawings

ANIONIC WATER-IN-WATER POLYMER DISPERSION, METHOD FOR THE PRODUCTION THEREOF AND ITS USE

The present invention relates to processes for the preparation of anionic water-in-water polymer dispersions which contain at least one finely distributed, water-soluble and/or water-swellable polymer A and a continuous aqueous phase which contains at least one polymeric dispersing agent B, to the water-in-water polymer dispersions obtainable thereby and to their use as auxiliaries in papermaking and/or as flocculating agents for the sedimentation of solids.

One of the fundamental problems when using a water-soluble polymeric flocculating agent is that of adequately dissolving this polymeric flocculating agent in water so that it can be used for the intended purpose.

Thus, very early on, water-soluble polymers were made available as dilute aqueous solutions. In the early 1970s, water-in-oil emulsions were introduced. Using the water-in-oil technology, it was possible to prepare high molecular weight polymers which dissolved very rapidly in water, such that this technology found great acceptance with the manufacturers of water-soluble polymers. The disadvantage of this water-in-oil technology was, however, that these emulsions contained substantial amounts of hydrocarbon liquid in the form of oils, whose incorporation into systems in which water-soluble polymers are conventionally used was only possible to a limited extent.

A further development of water-soluble polymeric flocculating agents involved the provision of processes for the preparation of dispersions of water-soluble cationic polymers. These polymers were prepared in an aqueous salt or a salt solution in which the polymer was insoluble. A disadvantage of such processes described, for example, in U.S. Pat. Nos. 4,929,655 and 5,006,590 is that these processes are virtually restricted to the preparation of dispersions of cationically charged water-soluble polymers which contain a proportion of a hydrophobic modified cationic monomer.

By contrast, these processes cannot be transferred without problems to the preparation of anionically charged water-soluble polymers, which are conventionally used as flocculating agents and as dewatering agents and retention auxiliaries in the paper industry.

In U.S. Pat. No. 5,837,776, a process for the preparation of water-soluble anionic dispersion polymers is described, by means of which aqueous dispersions of water-soluble nonionically and anionically charged vinyl and allyl addition polymers were obtained by polymerization in the presence of an anionically charged water-soluble polymeric stabilizing agent in a saturated salt solution at a pH of from 2 to 5. The salt content of these dispersions is from 5 to 40% by weight, based on the total weight of the dispersion, the proportion of the stabilizing agent being from 0.1 to 5% by weight, based on the total weight of the dispersion. These polymeric anionically charged stabilizing agents have a molecular weight of from 100,000 to 500,000 and are preferably polymers and copolymers of acrylamidomethylpropanesulfonic acid (AMPS), which is present in the polymers to an extent of at least 20 mol %.

U.S. Pat. No. 6,265,477 describes an aqueous dispersion of a disperse high molecular weight water-soluble anionic or nonionic polymer, which is obtained by polymerization of at least one anionic and nonionic monomer in the presence of an anionically charged water-soluble polymeric stabilizing agent, which contains from 1.25 to 20 mol % of acrylamidomethylpropanesulfonic acid and has a molecular weight of from 100,000 to 500,000, in an aqueous solution of a water-soluble salt at a pH of greater than 5, the salt content of these dispersions being from 5 to 40% by weight.

In order to obtain water-in-water dispersions that are easier to handle, the preparation of cationic water-in-water polymer dispersions in the prior art has been repeatedly described. By way of example, attention is called here to the patent specifications WO 98/14405, WO 98/31748, WO 98/31749, and EP-A-0 630 909. A disadvantage of these water-in-water-polymer dispersions is that they are subjected, at more than 25° C. to 50° C. to changes which result in an impairment of the advantageous properties of the water-in-water dispersions and can lead, for example, to prolonged dewatering times. By contrast, the water-in-water-polymer dispersions prepared according to the process described in DE-A-100 61 483 have virtually unchanged utility properties, even after storage under extreme conditions, such as at temperatures of more than 25° C. to 50° C. The preparation of these water-in-water-polymer dispersions is carried out here by subjecting monomers which are dispersed in an aqueous phase which contains the water-soluble dispersing agent B, to free-radical polymerization, if appropriate with the addition of a water-soluble salt, and, on completion of the polymerization of the water-in-water dispersion, adding a water-soluble acid. The acid is in this case added in amounts of from 0.1% to 5% by weight and the salt in amounts up to not more than 3% by weight, in each case based on the total dispersion, the acid and the salt together being added in amounts of not more than 5% by weight, based on the total dispersion.

There is, however, still a need for stable high molecular weight water-in-water-polymer dispersions which are easy to handle, can be metered directly, and are stable in storage, which require no mineral oil and contain only small amounts of, or no, salt, which can be employed advantageously for solid/liquid separation in multifarious fields of application, in particular as flocculating agents or flocculating auxiliaries for sedimentation, filtration, and flotation, preferably in the papermaking industry.

It is therefore an object of the present invention to provide such a process, in which anionic water-in-water-polymer dispersions are obtained which even after storage have virtually unchanged utility properties and also possess adequate stability to hydrolysis in an alkaline medium and can in particular be used in multifarious retention systems in the papermaking industry.

The object is achieved according to the invention by a process for the preparation of anionic water-in-water polymer dispersions which contain at least one finely divided, water-soluble and/or water-swellable polymer A and a continuous aqueous phase, this phase containing an aliquot of at least one polymeric dispersing agent B, in which monomers which are dispersed in this aqueous phase are subjected to free-radical polymerization and after completion of the polymerization the reaction mixture is subsequently diluted with the residual amount of the dispersing agent B.

"Anionic" water-in-water polymer dispersion is for the purposes of the invention to be understood as meaning a water-in-water polymer dispersion whose total charge is negative.

For the preparation of the water-in-water-polymer dispersions according to the invention, the monomers which are to be subjected to free-radical polymerization, preferably as an aqueous monomer solution, are finely divided in an aqueous phase which contains an aliquot of at least one polymeric dispersing agent B.

According to the invention, these polymeric dispersing agents are of relatively low molecular weight and have an average molecular weight $M_w$ of not more than 250,000 g/mol, in particular of from 25,000 to 250,000 g/mol, preferably from 50,000 to 100,000 g/mol and more preferably 65,000 g/mol, measured according to the GPC method (gel permeation chromatography using 1.5% strength formic acid as an eluent against pullulan standards).

Furthermore, these polymeric dispersing agents contain at least one of the functional groups selected from ether groups, carboxyl groups, sulfone groups, sulfate ester groups, amino groups, amido groups, imido groups, tert-amino groups, and/or quaternary ammonium groups.

As examples thereof mention may be made of cellulose derivatives, polyvinyl acetates, starch, starch derivatives, dextrans, polyvinylpyrrolidones, polyvinylpyridines, polyethylenimines, polyamines, polyvinylimidazoles, polyvinylsuccinimides, polyvinyl-2-methylsuccinimides, polyvinyl-1,3-oxazolid-2-ones, polyvinyl-2-methylimidazolines and/or their respective copolymers with maleic acid, maleic anhydride, fumaric acid, itaconic acid, itaconic anhydride, (meth)acrylic acid, salts and/or esters of (meth)acrylic acid and/or (meth)acrylamide compounds.

Preferably, the polymeric dispersing agents B employed are anionic polymers which are synthesized from at least 30% by weight, preferably at least 50% by weight, more preferably 100% by weight, of anionic monomer units which are derived from anionic monomers, such as, for example,
- olefinically unsaturated carboxylic acids and carboxylic acid anhydrides, in particular acrylic acid, methacrylic acid, itaconic acid, crotonic acid, glutaconic acid, maleic acid and maleic anhydride, fumaric acid and the water-soluble alkali metal salts thereof, alkaline earth metal salts thereof, and ammonium salts thereof
- olefinically unsaturated sulfonic acids, in particular aliphatic and/or aromatic vinylsulfonic acids, for example vinylsulfonic acid, allylsulfonic acid, styrenesulfonic acid, acrylic and methacrylic sulfonic acids, in particular sulfoethyl acrylate, sulfoethyl methacrylate, sulfopropyl acrylate, sulfopropyl methacrylate, 2-hydroxy-3-methacryloxypropylsulfonic acid and 2-acrylamido-2-methylpropanesulfonic acid, and the water-soluble alkali metal salts thereof, alkaline earth metal salts thereof, and ammonium salts thereof
- olefinically unsaturated phosphonic acids, in particular, for example, vinyl- and allyl-phosphonic acid and the water-soluble alkali metal salts thereof, alkaline earth metal salts thereof, and ammonium salts thereof
- sulfomethylated and/or phosphonomethylated acrylamides and the water-soluble alkali metal salts thereof, alkaline earth metal salts thereof, and ammonium salts thereof.

Preferably, the polymeric dispersing agents B employed are the water-soluble alkali metal salts of acrylic acid, polypotassium acrylates being particularly preferred according to the invention.

For the process according to the invention, it is essential to the invention that first only an aliquot of the polymeric dispersing agent B is employed, preferably 60 to 95% by weight, based on the total amount of dispersing agent, while the remaining amount of dispersing agent B is added for subsequent dilution after completion of the polymerization and cooling of the reaction mixture B. An aliquot of less than 5% by weight, based on the total dispersion, is inadequate for obtaining the anionic water-in-water-polymer dispersions of the invention.

In one embodiment of the process according to the invention, at least one water-soluble, polymeric dispersing agent B is employed together with a water-soluble polyfunctional alcohol and/or its reaction products with fatty amines. In particular, polyalkylene glycols, preferably polyethylene glycols, polypropylene glycols, block copolymers of propylene/ethylene oxide, having molecular weights of from 50 to 50,000, preferably from 1,500 to 30,000, low molecular weight polyfunctional alcohols such as glycerol, ethylene glycol, propylene glycol, pentaerythritol, and/or sorbitol are suitable for use as polyfunctional water-soluble alcohols and/or their reaction products with fatty amines containing from 6 to 22 carbons in the alkyl or alkylene radical.

The aqueous phase in which the monomers are dispersed, preferably in the form of an aqueous solution, must contain an adequate aliquot of water-soluble polymeric dispersing agent B and if appropriate, of a polyfunctional alcohol and/or said reaction product, in order that the polymer A that is formed during the reaction remains dispersed and an uncontrolled growth of the polymer particles and/or an agglomeration of the polymer particles formed is prevented.

Preferably, the polymeric dispersing agent B and the optionally present further dispersing agent components are employed in amounts of from 5 to 50% by weight, preferably from 5 to 30% by weight and more preferably from 5 to 15% by weight, based on the total weight of the dispersion.

When using further water-soluble dispersing agent components together with the polymeric dispersing agent B, a weight ratio of the polymeric dispersing agent B to these components should be in the range of from 1.00:0.01. In particular, a weight ratio of from 1.00:0.01 to 1.00:0.50 and preferably from 1.00:0.01 to 1.00:0.30 should be maintained.

The monomers which are preferably present in a finely and homogeneously dispersed form in the aqueous phase containing the polymeric dispersing agent B can comprise anionic, nonionic, amphiphilic and ethylenically unsaturated monomers, but also cationic monomers. In this case, in particular when using cationic monomers, the concentration thereof is to be chosen such that the total charge of the water-in-water-polymer dispersions prepared by the process according to the invention is negative. Moreover, in the case of an optionally present amount of water-insoluble monomers, these are chosen such that the water solubility or the water swellability of the polymer A obtained after the polymerization is not impaired.

The anionic monomers which can be used or selected by way of example according to the invention are those listed below:
a.) olefinically unsaturated carboxylic acids and carboxylic acid anhydrides, in particular acrylic acid, methacrylic acid, itaconic acid, crotonic acid, glutaconic acid, maleic acid, maleic anhydride, fumaric acid and the water-soluble alkali metal salts thereof, alkaline earth metal salts thereof, and ammonium salts thereof
b.) olefinically unsaturated sulfonic acids, in particular aliphatic and/or aromatic vinyl-sulfonic acids, for example vinylsulfonic acid, allylsulfonic acid, styrenesulfonic acid, acrylic and methacrylic sulfonic acids, in particular sulfoethyl acrylate, sulfoethyl methacrylate, sulfopropyl acrylate, sulfopropyl methacrylate, 2-hydroxy-3-methacryloxypropyl-sulfonic acid and 2-acrylamido-2-methylpropanesulfonic acid and the water-soluble alkali metal salts thereof, alkaline earth metal salts thereof, and ammonium salts thereof
c.) olefinically unsaturated phosphonic acids, in particular, for example, vinyl- and allyl-phosphonic acid and the water-soluble alkali metal salts thereof, alkaline earth metal salts thereof, and ammonium salts thereof
d.) sulfomethylated and/or phosphonomethylated acrylamides and the water-soluble alkali metal salts thereof, alkaline earth metal salts thereof, and ammonium salts thereof.

Preferably, olefinically unsaturated carboxylic acids and carboxylic acid anhydrides, in particular acrylic acid, methacrylic acid, itaconic acid, crotonic acid, glutaconic acid, maleic acid, maleic anhydride, fumaric acid, and the water-soluble alkali metal salts thereof, alkaline earth metal salts thereof, and ammonium salts thereof are employed as anionic monomers, the water-soluble alkali metal salts of acrylic acid, in particular its sodium and potassium salts and its ammonium salts, being particularly preferred.

When using 2-acrylamido-2-methylpropanesulfonic acid (AMPS) as the anionic monomer or the water-soluble alkali metal salts thereof, alkaline earth metal salts thereof, and ammonium salts thereof, it should be noted that the higher the amount of 2-acrylamido-2-methylpropanesulfonic acid and its salts in the high molecular weight phase, ie polymer A, the more pasty the dispersion according to the invention, and amounts of AMPS above 2% by weight can lead to subsequent thickening of the dispersion on storage at elevated temperatures.

Nonionic monomers used for the preparation of the polymers A are, for example, compounds of the general formula (I)

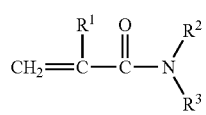

(I)

in which
$R^1$ stands for a hydrogen radical or a methyl radical, and
$R^2$ and $R^3$ independently of one another stand for hydrogen, or an alkyl or hydroxyalkyl radical of 1 to 5 carbon atoms, and
$R^2$ or $R^3$ stands for an OH group, Preferably, (meth)acrylamide, N-methyl(meth)acrylamide, N-isopropyl(meth)acrylamide or N,N-substituted (meth)acrylamides, such as N,N-dimethyl(meth)acrylamide, N,N-diethyl(meth)acrylamide, N-methyl-N-ethyl(meth)acrylamide or N-hydroxyethyl(meth)acrylamide, are employed.

According to the invention, advantageously the nonionic monomers employed can in particular be the water-soluble or water-dispersible derivatives of acrylic and methacrylic acid such as, for example, acrylamide, methacrylamide, and n-alkyl-substituted acrylamides. According to the invention acrylamide is very particularly preferred as a nonionic monomer.

The amphiphilic monomers used are compounds of the general formula (II)

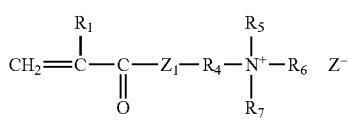

(II)

wherein
$Z_1$ stands for O, NH, $NR_4$, wherein $R_4$ denotes alkyl containing 1 to 4 carbon atoms,
$R_1$ stands for hydrogen or a methyl radical,
$R_4$ stands for alkylene containing 1 to 6 carbon atoms,
$R_5$ and $R_6$ independently stand for an alkyl radical containing 1 to 6 carbon atoms,
$R_7$ stands for an alkyl, aryl, and/or aralkyl radical containing 8 to 32 carbon atoms and
$Z^-$ stands for halogen, pseudohalogen, $SO_4CH_3^-$ or acetate or compounds of the general formula (III)

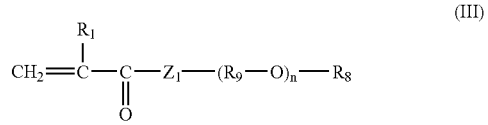

(III)

wherein
$Z_1$ stands for O, NH, $NR_4$, wherein $R_4$ denotes alkyl containing 1 to 4 carbon atoms,
$R_1$ stands for hydrogen or a methyl radical,
$R_5$ stands for hydrogen, an alkyl, aryl and/or aralkyl radical containing 8 to 32 carbon atoms,
$R_9$ stands for an alkylene radical containing 2 to 6 carbon atoms
n stands for an integer from 1 to 50.

Preferably, these are reaction products of (meth)acrylic acid with polyethylene glycols (10 to 40 ethylene oxide units), which are etherified with fatty alcohol, or the corresponding reaction products with (meth)acrylamide.

Suitable cationic monomers which can optionally likewise be employed for the preparation of the polymers A, whose use takes place under the premise that the total charge of the water-in-water polymer dispersions prepared by the process according to the invention is negative, are compounds of the general formula (IV)

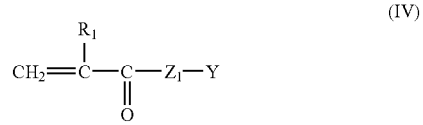

(IV)

in which
$R_1$ stands for hydrogen or a methyl radical,
$Z_1$ stands for O, NH or $NR_4$ where $R_4$ stands for an alkyl radical containing 1 to 4 carbon atoms,
Y stands for one of the groups

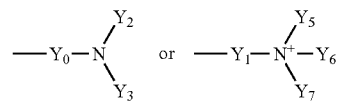

wherein
$Y_0$ and $Y_1$ stand for an alkylene radical or hydroxyalkylene radical containing 2 to 6 carbon atoms,
$Y_2, Y_3, Y_4, Y_5, Y_6, Y_7$, independently stand for an alkyl radical containing 1 to 6 carbon atoms,
$Z^-$ stands for halogen, acetate, or $SO_4CH_3^-$.

Preferably, suitable protonated or quaternized dialkylaminoalkyl are (meth)acrylates or dialkylaminoalkyl(meth)acrylamides containing from 1 to 3 carbons in the alkyl or alkylene groups, more preferably the methyl chloride-quaternized ammonium salt of dimethylaminoethyl(meth)acrylate, dimethylaminopropyl(meth)acrylate, dimethylaminoethyl (meth)acrylate, diethylaminoethyl(meth)acrylate, dimethylaminomethyl(meth)acrylate dimethylaminoethyl(meth) acrylamide and/or dimethylaminopropy(meth)acrylamide.

For the preparation of polymer A, a monomer composition is used which consists of from 0 to 100% by weight, preferably of from 5 to 70% by weight and more preferably from 5 to 40% by weight of anionic monomers, in each case based on the total weight of monomer. Very preferably, the preparation of polymer A is carried out using a mixture of nonionic monomers, preferably acrylamide and anionic monomers, in particular olefinically unsaturated carboxylic acids and carboxylic acid anhydrides, preferably acrylic acid, methacrylic acid, itaconic acid, crotonic acid, glutaconic acid, maleic acid, maleic anhydride, fumaric acid and the water-soluble alkali metal salts thereof, alkaline earth metal salts thereof, and ammonium salts thereof, acrylic acid being particularly preferred as the anionic monomer.

A mixture of acrylic acid with alkyl(meth)acrylates and/or alkyl(meth)acrylamides is also preferred.

In such monomer compositions, the amount of anionic monomers is preferably at least 5% by weight.

The monomers or the aqueous solution thereof are dispersed in an amount of from 5 to 30% by weight and preferably from 10 to 30% by weight, based on the total weight of the solution or the resulting total dispersion, in the aqueous phase containing an aliquot of at least one dispersing agent B. For example, an aqueous monomer solution has a concentration of 5 to 60% by weight, preferably 10 to 50% by weight, based on the total aqueous monomer solution. The high molecular weight polymer A is subsequently formed from the monomers by polymerization.

The polymers A prepared by the process according to the invention are of high molecular weight, but are nevertheless water-soluble or water-swellable polymers having an average molecular weight $M_w$, measured by the GPC method, of $>1.0\times10^8$ g/mol, the average molecular weight $M_w$ of the polymer A always being greater than that of the polymeric dispersing agent B.

The polymeric dispersing agent B and the polymer A, however, differ from each other, the difference being a consequence of the respective physical characteristics, in particular of their different molecular weights and/or of their chemical structure, eg due to the use of different monomer compositions.

According to the invention, preferred water-in-water polymer dispersions contain as a dispersing agent a potassium or sodium acrylate having a molecular weight of about 65,000 g/mol (determined by means of gel permeation chromatography) or as monomer units for the high molecular weight phase, ie polymer A, acrylamide (80% by weight), potassium, ammonium or sodium acrylate (20% by weight) are employed.

The polymerization can be optionally carried out in the presence of a water-soluble salt by the process according to the invention. If the addition of water-soluble salts is intended, ammonium, alkali metal and/or alkaline earth metal salts, preferably ammonium, sodium, potassium, calcium and/or magnesium salts can in particular be employed. Such salts can be salts of an inorganic acid or of an organic acid, preferably of an organic carboxylic acid, sulfonic acid, phosphonic acid, or of a mineral acid. The water-soluble salts of aliphatic or aromatic mono-, di- or polycarboxylic acids, hydroxycarboxylic acids, in particular of acetic acid, propionic acid, citric acid, oxalic acid, succinic acid, malonic acid, adipic acid, fumaric acid, maleic acid, and benzoic acid or sulfuric acid, hydrochloric acid or phosphoric acid, are preferred. Very preferably, sodium chloride, ammonium sulfate, and/or sodium sulfate are used as water-soluble salts.

The addition of the salt to the system can take place prior to polymerization, during polymerization, or after polymerization. The addition of the salt prior to polymerization of the monomer is preferred.

If a salt is used in the preparation of the water-in-water polymer dispersion, this salt is added in amounts of up to not more than 3.0% by weight, preferably in amounts of from 0.5 to 2.5% by weight and more preferably in amounts of from 0.75 to 2.0% by weight, in each case based on the total dispersion.

To carry out the process of the invention, the continuous aqueous phase is prepared by dissolving or diluting the aliquot of the polymeric dispersing agent B, optionally a polyfunctional alcohol, and/or a corresponding reaction product with fatty amines in water and dispersing the monomers or the aqueous solution thereof according to known dispersion methods, preferably by stirring.

The monomers of the polymer A can be introduced directly into the continuous aqueous phase as such or preferably as an aqueous monomer solution.

The monomer solution in general contains from 5 to 80% by weight and preferably from 10 to 50% by weight, based on the total solution, of monomers and the remaining amount is water with auxiliaries optionally present therein, such as, for example, chelating agents. To start the polymerization, for example, free-radical initiators, so-called polymerization initiators, are used. The free-radical initiators preferably employed are ago compounds, such as, for example, 2,2-azobisisobutyronitrile, 2,2-azobis(2-aminopropane) dihydrochloride or preferably potassium persulfate, ammonium persulfate, hydrogen peroxide, if appropriate in combination with a reducing agent, such as, for example, an amine or sodium sulfite. The amount of initiator, based on the monomers to be polymerized, is in general from $10^{-3}$ to 1% by weight and preferably from $10^{-2}$ to 0.1% by weight. The initiators can be added all at once at the commencement of the polymerization or alternatively only portionwise with a subsequent metering of the residual amount throughout the polymerization. Likewise, the monomers or the monomer solution can be dispersed all at once or only as an aliquot of the dispersing agent B at the commencement of the polymerization, the remainder of the monomers or monomer solution being added in metered portions or as a continuous supply with dispersion throughout the polymerization. Moreover, it is also possible to carry out the preparation of the water-in-water-dispersions according to the process of EP-A-0 664 302, the relevant disclosure of which is incorporated herein by reference. Essentially, in this procedure water is eliminated during the polymerization and, if appropriate, polymeric dispersing agent B is added.

The polymerization temperature is in general from 0 to 120° C. and preferably from 30 to 90° C. Preferably, the polymerization is carried out such that the system is flushed with inert gas and the reaction mixture is polymerized under a blanket of inert gas, eg under a blanket of nitrogen. The polymerization conversion or the termination of the polymerization can be ascertained in a simple manner by determining the residual monomer content. The methods for accomplishing this are known to the person skilled in the art.

Following polymerization, the reaction mixture is, according to the invention, subsequently diluted with the residual amount of the dispersing agent B. It is advantageous to cool the reaction mixture, preferably to ≦35° C. and to subsequently dilute it with from 5 to 50% by weight, preferably from 10 to 40% by weight and more preferably from 20 to 35% by weight of dispersing agent B, based on the total amount thereof. This subsequent dilution step is obligatory, as otherwise the anionic water-in-water polymer dispersions according to the invention would not be obtained.

The water-in-water-polymer dispersions obtainable according to the invention or the process for their preparation are an advantageous alternative to the known anionic, high molecular weight polyacrylamide/polyacrylate copolymers, which are prepared either as granules or as liquid water-in-oil emulsions. The water-in-water polymer dispersions are a highly concentrated, effective liquid system not containing mineral oil or surfactants, which has a good storage stability even at relatively high environmental temperatures and is, moreover, nonflammable. It has no volatile organic content (VOC) and the chemical or biological oxygen demand is extremely low compared with the corresponding emulsions. The products according to the invention have outstanding solubility in water and are also suitable undiluted for direct metering in an application.

Due to these properties, and, in particular, due to the fact that the water-in-water polymer dispersions according to the invention are easy to handle, directly meterable, storage-stable dispersions, which require no mineral oil and contain only small amounts of, or no, salt, they can be employed advantageously for solid/liquid separation, preferably in aqueous systems, in multifarious fields of application.

For example, they can be used as flocculating agents for flocculating auxiliaries for sedimentation, filtration and flotation, preferably in water and process water purification or waste water purification, in the recovery of raw material, in particular coal, aluminum, or petroleum, or as a demulsifier in the separation of oil-containing and/or fat-containing water mixtures and more preferably in the papermaking industry as auxiliaries in paper production, especially in cationic paper pulps.

Furthermore, the water-in-water polymer dispersions can be used in retention agent systems such as, for example, in the form of single component systems, soluble two-component systems and microparticular systems. The choice of aforementioned system to be used here depends on various factors, such as, for example, the fibrous material composition and the type of filler, but in particular on the nature and amount of the undesirable substances present in the paper pulp.

In single component systems, these being the simplest retention systems, the use of the anionic water-in-water-polymer dispersions according to the invention in cationic paper suspensions causes aggregation of the cationic solids in the suspension.

Since the increasing batches of waste paper and very frequent occurrences of shutdown of the water circulations in papermaking plants produce a constantly growing freight of unwanted substances which in some cases can no longer be controlled using single component systems, it is known to meter two different retention agents as a so-called soluble two-component system. The first component used in such a case is a low molecular weight polymer and, the second component, a high molecular weight cationic or anionic polyacrylamide follows. Furthermore, there are systems in which the two components are mixed beforehand to give a dual system and are added together to the paper pulp.

Advantageously, the water-in-water-polymer dispersions according to the invention can be metered not only on their own, but also as so-called dual systems (anionic/cationic or cationic/anionic) to such paper pulps. It is a special advantageous that in this case the water-in-water polymer dispersions according to the invention can be made to order as a single product customized for this particular purpose, so that it is no longer necessary to mix the components to create the dual system required.

With respect to the use of the water-in-water-polymer dispersions according to the invention, it may be pointed out by way of explanation, that microparticular systems conventionally consist of two components, namely a water-soluble cationic polymer and a colloidally dissolved or suspended anionic microparticular component, the latter having a large specific surface area. In papermaking, the cationic polymer is then added first, for example immediately upstream or downstream of the flowbox pump or upstream of the vertical screen. This causes partial covering of the fiber and filler surfaces, because of which the total charge can definitely still be negative:

Subsequently, anionic microparticles are added, and the site of addition should be as close as possible to the flow box. They react with the cationic polymers accumulated on the fiber and filler surfaces and form a kind of bridge. A fine dense flock having a reversible formation character is obtained.

Preferably, the anionic water-in-water dispersions according to the invention can be used for paper machines which are used for the production of moisture-resistant/strongly brightened paper qualities, such as, for example, laminate papers, label papers, but also in some cases tissue papers or special papers (e.g. banknotes). Advantageously, the water-in-water dispersions according to the invention make possible, in particular with respect to granules, better sheet formation. Moreover, it has been found that the use of the water-in-water polymer dispersions, in particular in the paper industry, is extremely economical. Thus an industrial large-scale experiment, in which the water-in-water polymer dispersions were used as flocculating agents in the production of label papers, showed that in this assay showing a consumption of 60 kg/day of the anionic water-in-water dispersions it was possible to lower the pulp loss through the hopper from 8 to 10 t/day to <1 t/day.

Furthermore, the water-in-water-polymer dispersions according to the invention are very highly suitable for the treatment of paint waste waters or can be used in waste water treatment plants of factories comprising a number of paper machines which produce different types of paper.

Moreover, the water-in-water polymer dispersions according to the invention can also be used in raw water purification (surface water).

Methods

1. Determination of the Solution Viscosity

For the determination of the solution viscosity of the water-in-water dispersions prepared according to the invention, a 5% strength solution of the dispersions is prepared. 340 g of the 5% strength solution is needed for the measurement. To this end, the necessary amount of demineralized water is introduced into a 400 ml beaker. Subsequently, the water introduced is stirred with a pencil stirrer so vigorously that a cone forms which extends to the bottom of the beaker. The amount of water-in-water dispersion necessary for the preparation of the 5% strength solution is injected into the stirred water as a single dose by means of a disposable syringe. The solution is subsequently stirred at 300 rpm (±10 rpm) for one hour. After a standing time of 10 minutes, the Brookfield viscosity is determined with the aid of an RVT-DVII Brookfield viscometer using a spindle 2 at speed 10.

2. Determination of the Salt Viscosity 289 g of completely demineralized water are weighed into a 400 ml beaker. Subsequently, the water introduced is stirred so vigorously with a pencil stirrer that a cone forms which extends to the bottom of the beaker. 17 g of the water-in-water dispersion prepared according to the invention are injected into the stirred water as a single dose by means of a disposable syringe. After the water-in-water dispersion has dissolved, 34 g of sodium chloride (technical) are strewn in. After stirring at 300 rpm (±10 rpm) for 16 minutes, the solution is allowed to stand for a further 10 minutes. Subsequently, the Brookfield viscosity is determined with the aid of a Brookfield RVT-DV II viscometer using spindle 1 at speed 10.

EXAMPLES

In the following examples, which are only intended to illustrate the invention, the solution or salt viscosity, the flocculating value and the dewatering action are determined by the methods indicated above. The term solution is always to be understood as meaning an aqueous solution.

allowed to react at this temperature for 15 min. After cooling to room temperature, the mixture is subsequently diluted with 100 g of polypotassium acrylate (37% strength).

The polymer content of the dispersion (15.5% dispersed phase and 10.4% dispersing agent based on the total dispersion) is kept constant independently of the salt concentration and amount of dispersing agent etc., if appropriate by adjustment of the amount of water.

All percentage data are in percentages by weight, based on the total dispersion.

The product viscosity 2 after storage at room temperature is determined after one day.

After 5 days, the condition of the w/w dispersions is assessed after storage at 40° C. Experiments in which the thickening point during the reaction became critical for the stirrer and apparatus were terminated prematurely.

TABLE 1

Influence of the amount of salt
(at pH = 6 with polypotassium acrylate as the dispersing agent)

| Ex. No. | $(NH_4)_2SO_4$ [g] | $(NH_4)_2SO_4$ [%] | Product viscosity 1 as prepared [mPas] | Product viscosity 2 after storage [mPas] | Δ p.v. 1 − p.v. 2 [mPas] | Storage at 40° C. | Solution viscosity [mPas] | Salt viscosity [mPas] |
|---|---|---|---|---|---|---|---|---|
| 1 | 0 | 0 | 14200 | 26600 | 12400 | liquid | 2290 | 720 |
| 2 | 5 | 0.45 | 14400 | 27400 | 13000 | liquid | 2240 | 709 |
| 3 | 10 | 0.91 | 15200 | 21200 | 6000 | liquid | 1690 | 610 |
| 4 | 16.5 | 1.5 | 15600 | 22000 | 6400 | liquid | 1960 | 710 |
| 5 | 22 | 2 | 16200 | 24800 | 8600 | solid in 10 days | 1800 | 790 |
| 6 | 55 | 5 | 21600 | 37200 | 15600 | solid | 1000 | 550 |
| 7 | 110 | 10 | 17700 | 30900 | 13200 | solid | 780 | 560 |
| 8 | 165 | 15 | 17400 | xxx | xxx | solid | xxx | xxx |

General Procedure 0.5 g of pentasodium diethylenetriaminepentaacetate (40% strength), 210.0 g of a dispersing agent (37% strength) and, if appropriate, ammonium sulfate are added to a solution of 272.0 g of acrylamide (50% strength) and 27.4 g of acrylic acid in water after pH adjustment using a 25% strength ammonia solution (or if appropriate using 50% strength sulfuric acid). The mixture is added to a 2 liter flask having a stirring apparatus (KPG stirrer) and heated to a temperature of 40° C. After freeing from oxygen by blowing through nitrogen, 91 ppm of an azo initiator (as a 10% strength solution) and 73 ppm of an oxidant (as a 4% strength solution) are added. On reaching the temperature maximum $T_{max}$, a further 364 ppm of an azo initiator are added and the mixture is then Result:

An increased salt concentration does not have a positive effect. At a salt concentration of about 0.9 to 1.5%, the subsequent thickening behavior at room temperature (Δ) is minimal and this is an altogether comparatively low product viscosity. The products are also storage-stable at elevated temperature.

TABLE 2

Influence of the pH
(Example 11 corresponds to Example 3; the dispersing agent is polypotassium acrylate)

| Ex. No. | pH | Product viscosity 1 as prepared [mPas[ | Product viscosity 2 after storage [mPas[ | Δ p.v. 1 − p.v. 2 [mPas[ | Storage at 40° C. | Solution viscosity [mPas[ | Salt viscosity [mPas[ |
|---|---|---|---|---|---|---|---|
| 9 | 3 | xxx | xxx | Xxx | solid | xxx | xxx |
| 10 | 5 | xxx | xxx | Xxx | solid | xxx | xxx |
| 11 | 8 | 15200 | 21200 | 6000 | liquid | 1690 | 610 |
| 12 | 7 | 18200 | 25400 | 7200 | liquid | 1620 | 610 |
| 13 | 9 | 11200 | xxx | Xxx | solid | 1300 | 490 |

Result:

The polymerization should be carried out in a pH range of from 6 to 7.

TABLE 3

Influence of the amount of dispersing agent B
(The amounts of polyacrylate mentioned in the general procedure, in this case of poly-potassium acrylate based on Example 18 (corresponds to Example 3) were varied, $M_w$ = 65.000 g/mol).

| Ex. No. | Poly-potassium acrylate [g] | Poly-potassium acrylate [%] | Poly-potassium acrylate subsequent dilution [g] | Poly-potassium acrylate subsequent dilution [%] | Total poly-potassium acrylate [%] | Product viscosity 1 as prepared [mPas] | Product viscosity 2 after storage at RT [mPas] | Storage at 40° C. | Solution viscosity [mPas] | Salt viscosity [mPas] |
|---|---|---|---|---|---|---|---|---|---|---|
| 14 | 88.73  | 2.98  | 0   | 0    | 2.98  | xxx    | xxx   | xxx    | xxx  | xxx |
| 15 | 147.88 | 4.97  | 0   | 0    | 4.97  | xxx    | xxx   | xxx    | xxx  | xxx |
| 16 | 310    | 10.43 | 0   | 0    | 10.43 | 110,000| xxx   | xxx    | xxx  | xxx |
| 17 | 130    | 4.37  | 180 | 6.05 | 10.42 | xxx    | xxx   | xxx    | xxx  | xxx |
| 18 | 210    | 7.06  | 100 | 3.36 | 10.42 | 15200  | 21200 | liquid | 1690 | 610 |

Result:
Amounts of dispersing agent as an additive before polymerization of less than 5% by weight are not adequate, even if after completion of the polymerization it is still subsequently diluted. The subsequent dilution (division of the amount of dispersing agent) is obligatory.

TABLE 4

Influence of the molecular weight of the dispersing agent B
(Example 19 corresponds to Example 3; the dispersing agent is polypotassium acrylate)

| Ex. No. | $M_w$ Dispersing agent [g] | Product viscosity 1 as prepared [mPas[ | Product viscosity 2 after storage at RT [mPas[ | Δ p.v. 1 – p.v. 2 [mPas[ | Storage at 40° C. | Solution viscosity [mPas[ | Salt viscosity [mPas[ |
|---|---|---|---|---|---|---|---|
| 19 | 65,000  | 15200 | 21200 | 6000 | liquid | 1690 | 610 |
| 20 | 75,000  | 17600 | 24500 | 6900 | liquid | 1400 | 500 |
| 22 | 95,000  | xxx   | xxx   | xxx  | solid  | xxx  | xxx |
| 23 | 130,000 | xxx   | xxx   | xxx  | solid  | xxx  | xxx |
| 24 | 170,000 | xxx   | xxx   | xxx  | solid  | xxx  | xxx |

Result: The optimal molecular weight range for the dispersing agent B is not more than about 75,000 g/mol.

TABLE 5

Variation of the counterion of the dispersed polymer phase A
For neutralization, KOH (45% strength) and NaOH (50% strength) are used instead of ammonia (25% strength). Example 24 corresponds to Example 3. The dispersing agent is polypotassium acrylate.

| Ex. No. | Counterion polymer A | Product viscosity 1 as prepared [mPas[ | Product viscosity 2 after storage at RT [mPas[ | Δ p.v. 1 – p.v. 2 [mPas[ | Storage at 40° C. | Solution viscosity [mPas[ | Salt viscosity [mPas[ |
|---|---|---|---|---|---|---|---|
| 24 | $NH_4^+$ | 15200 | 21200 | 6000  | liquid | 1690 | 610 |
| 25 | $NH_4^+$ | 17100 | 23300 | 6200  | liquid | 2140 | 740 |
| 26 | $K^+$    | 13100 | n.b.  | n.b.  | liquid | 1400 | 500 |
| 27 | $K^+$    | 12500 | 16600 | 41000 | liquid | 1650 | 750 |
| 28 | $Na^+$   | 13400 | n.b.  | n.b.  | liquid | 1360 | 550 |
| 29 | $Na^+$   | 15500 | 21900 | 6700  | liquid | 1600 | 620 |

Result: All counterions can be used for polymer A.

TABLE 6

Influence of the temperature on the subsequent dilution
(Example 32 corresponds to Example 3; the dispersing agent is polypotassium acrylate)

| Ex. No. | Temperature subsequent dilution [° C.] | Product viscosity 1 as prepared [mPas] | Product viscosity 2 after storage at RT [mPas] | Δ p.v. 1 − p.v. 2 [mPas] | Storage at 40° C. | Solution viscosity [mPas] | Salt viscosity [mPas] |
|---|---|---|---|---|---|---|---|
| 30 | Tmax (ca 75) | 21000 | 32700 | 11700 | liquid | 1770 | 650 |
| 31 | 45 | 15600 | 22600 | 7000 | liquid | 1820 | 690 |
| 32 | <30 | 15200 | 21200 | 6000 | liquid | 1690 | 610 |

Result: It is particularly advantageous to effect subsequent dilution below 30° C.

TABLE 7

Influence of the subsequent treatment on the residual monomer content
(Examples 30 to 32 correspond to Example 3)

| Example No. | Measurement | Residual monomer content of acrylic acid [ppm] | Residual monomer content of acrylamide [ppm] |
|---|---|---|---|
| 33a | Prior to subsequent treatment | 2140 | 3620 |
| 33b | Following subsequent treatment with VA044 | 980 | 490 |
| 33c | Subsequent treatment with VA044 | 720 | 290 |
| 33d | Subsequent treatment with ABAH | 830 | 330 |

Result:
The residual monomer content is markedly reduced by a subsequent treatment of the dispersion.

TABLE 8

Influence of AMPS Na in the high molecular weight phase
(Polypotassium acrylate is the dispersing agent; Example 36 corresponds to Example 3)

| Ex. No. | AMPS-Na [g] | AMPS-Na [%] | Product viscosity 1 as prepared [mPas] | Product viscosity 2 after storage [mPas] | Δ p.v. 1 − p.v. 2 [mPas] | Storage at 40° C. | Solution viscosity [mPas] | Salt viscosity [mPas] |
|---|---|---|---|---|---|---|---|---|
| 36 | 0 | 0 | 15200 | 21200 | 6000 | liquid | 1690 | 610 |
| 37 | 10.2 | 0.93 | 14300 | 23000 | 8700 | liquid | 1860 | 710 |
| 38 | 20.4 | 1.85 | 16200 | 23600 | 7400 | liquid | 1900 | 740 |
| 39 | 30.8 | 2.78 | 14600 | 20100 | 5500 | liquid to pasty | 1600 | 730 |
| 40 | 50.1 | 4.64 | 13400 | 17000 | 3600 | liquid to pasty | 1370 | 750 |
| 41 | 68 | 6.18 | 8000 | 17700 | 9700 | liquid to pasty | 800 | 560 |

Result:

The higher the proportion of AMPS Na in the high molecular weight phase, the more pasty the dispersion. Amounts of AMPS greater than 2% by weight lead to subsequent thickening on storage at higher temperatures.

TABLE 9

Influence of the counterions of the dispersing agent B
(Example 42 corresponds to Example 3; Mw = 65.000 g/mol)

| Ex. No. | Counterion low molecular weight phase | Product viscosity 1 as prepared [mPas] | Product viscosity 2 after storage at RT [mPas] | Δ p.v. 1 − p.v. 2 [mPas] | Storage at 40° C. | Solution viscosity [mPas] | Salt viscosity [mPas] |
|---|---|---|---|---|---|---|---|
| 42 | K$^+$ | 15200 | 21200 | 6000 | liquid | 1690 | 610 |
| 43 | Na$^+$ | 42000 | pasty | xxx | solid | 1630 | 600 |

TABLE 9-continued

Influence of the counterions of the dispersing agent B
(Example 42 corresponds to Example 3; Mw = 65.000 g/mol)

| Ex. No. | Counterion low molecular weight phase | Product viscosity 1 as prepared [mPas[ | Product viscosity 2 after storage at RT [mPas[ | Δ p.v. 1 – p.v. 2 [mPas[ | Storage at 40° C. | Solution viscosity [mPas[ | Salt viscosity [mPas[ |
|---|---|---|---|---|---|---|---|
| 44 | $NH_4^+$ | xxx | xxx | xxx | xxx | xxx | xxx |

Result: For the dispersing agent B, the $K^+$ ion is best suited as a counterion.

TABLE 10

Concentration of the product during the preparation (analogously to EP 0 664 302 Bi) followed by subsequent dilution with dispersing agent B.
Examples 61 to 63 were prepared as Example 3; but after reaching the thickening point a vacuum of 250 mbar is applied and water is distilled off at a temperature of 70° C. (see Table 12). The reaction apparatus is subsequently let down to standard pressure and dispersing agent B is correspondingly replaced. After cooling to room temperature, the mixture is treated as usual. Polymer content of Example 62 (15.5% of disperse phase and 12.1% of dispersing agent based on the total dispersion). Polymer content of Example 63 (15.5% of disperse phase and 13.8% of dispersing agent based on the total dispersion).

| Ex. No. | Vacuum [mbar] | [g] of water distilled off [g] | Product viscosity 1 as prepared [mPas] | Product viscosity 2 after storage at RT [mPas] | Δ p.v. 1 – p.v. 2 [mPas] | Storage at 40° C. | Solution viscosity [mPas] | Salt viscosity [mPas] |
|---|---|---|---|---|---|---|---|---|
| 61 | 1020 | 0 | 15200 | 21200 | 6000 | Liquid | 1690 | 610 |
| 62 | 250 | 50 | 7600 | 10800 | 3200 | Liquid | 1460 | 540 |
| 63 | 250 | 100 | 4840 | 6280 | 1440 | liquid | 1320 | 530 |

Result: It is advantageous to remove water by distillation and to replace it by dispersing agent B.

The inventioned claimed is:

1. A process for the production of anionic water-in-water polymeric dispersions comprising at least one finely dispersed, water-soluble and/or water-swellable polymer A, comprising anionic monomer units and, optionally, one or more of non-ionic, amphiphilic, and cationic monomer units, having a $M_w$ of $>1.0\times10^6$ g/mol and a continuous aqueous phase, which phase contains a first portion of a polymeric dispersing agent B and said polymeric dispersing agent B consists of potassium polyacrylate having an average molecular weight Mw of 65,000-75,000 g/mol, wherein the aliquot is present in an amount of at least 5% by weight, based on the weight of the total dispersion, the process comprising:
free radically polymerizing a monomer composition comprising at least the anionic monomers and, optionally, the non-ionic, amphiphilic, and cationic monomer units in the presence of at least 5% by weight of said potassium polyacrylate dispersing agent B based on the total weight of the dispersion and from 0.9% by weight to 1.5% by weight of an inorganic salt based on the total weight of the dispersion, to form a reaction mixture, and
on completion of said polymerization, diluting the reaction mixture with a second portion of said potassium polyacrylate dispersing agent B,
wherein the anionic monomers are selected from the group consisting of
a.) an olefinically unsaturated carboxylic acid, a carboxylic anhydride, a water-soluble alkali metal salt thereof, an alkaline earth metal salt thereof, and an ammonium salt thereof.

2. A process as defined in claim 1, wherein the first portion of the amount of said potassium polyacrylate dispersing agent B in the aqueous phase is equal to from 60 to 95% by weight of the total weight of the amount of the dispersing agent B.

3. A process as defined in claim 1, wherein the potassium polyacrylate dispersing agent B is present as a mixture with at least one water-soluble polyfunctional alcohol and/or its reaction product with fatty amines.

4. A process as defined in claim 3, wherein the potassium polyacrylate dispersing agent B is present as a mixture with at least one of a water-soluble polyfunctional alcohol, a polyalkylene glycol, a block copolymer of propylene/ethylene oxide having molecular weights of from 50 to 50 000, a low-molecular weight polyfunctional alcohol and reaction products thereof with fatty amines containing from 6 to 22 carbons in the alkyl or alkylene radical.

5. A process as defined in claim 3, wherein said potassium polyacrylate dispersing agent B is present as a mixture with at least one polyfunctional alcohol in amounts of from 5 to 50% by weight, based on the total dispersion.

6. A process as defined in claim 3, wherein the ratio, by weight, of said potassium polyacrylate dispersing agent B to said polyfunctional alcohol is in the range of from 1.00:0.01 to 1.00:0.5.

7. A process as defined in claim 1, wherein the polymer A comprises at least one non-ionic monomer of the formula (I)

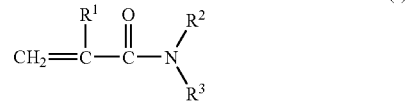

in which $R^1$ stands for a hydrogen radical or a methyl radical, and $R^2$ and $R^3$ independently stand for hydrogen, or an alkyl or hydroxyalkyl radical each containing from 1 to 5 carbon atoms, and $R^2$ or $R^3$ stands for an OH group.

8. A process as defined in claim 1, wherein the polymer A comprises one or more amphiphilic monomers of formula (II)

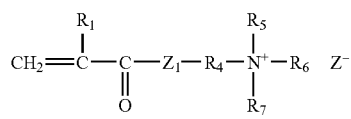

wherein $Z_1$ stands for O, NH, $NR_4$, wherein $R_4$, denotes alkyl containing from 1 to 4 carbons, $R_1$ stands for hydrogen or a methyl radical, $R_4$ stands for alkene containing from 1 to 6 carbons, $R_5$ and $R_6$ independently stand for an alkyl group containing from 1 to 6 carbons, $R_7$ stands for an alkyl radical, an aryl radical, and/or an aralkyl radical containing from 8 to 32 carbons and $Z^-$ stands for halogen, pseudo-halogen, $SO_4CH_3^-$ or acetate, or monomers of the general formula (III)

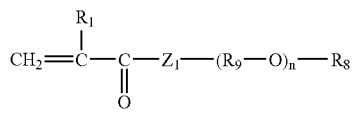

wherein $Z_i$ stands for O, NH, or $NR_4'$, wherein $R_4$, denotes alkyl containing from 1 to 4 carbons, $R_1$ stands for hydrogen or a methyl radical, $R_8$ stands for hydrogen, an alkyl radical, an aryl radical, and/or an aralkyl radical containing from 8 to 32 carbons, $R_9$ stands for an alkylene radical containing from 2 to 6 carbons, and n stands for an integer from 1 to 50.

9. A process as defined in claim 1, wherein the polymer A comprises cationic monomers of formula (IV)

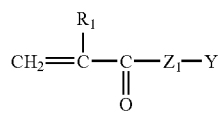

wherein $R_1$ stands for hydrogen or a methyl radical, $Z_1$ stands for O, NH or $NR_4$ where $R_4$ stands for an alkyl radical containing 1 to 4 carbon atoms, Y stands for one of the groups

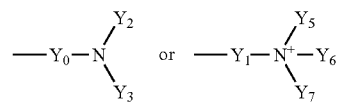

$Y_0$ and $Y_1$ stand for an alkylene radical or hydroxyalkylene radical containing 2 to 6 carbon atoms, and $Y_2, Y_3, Y_5, Y_6, Y_7$, independently stand for an alkyl radical containing 1 to 6 carbon atoms.

10. A process as defined in claim 1, wherein the monomer composition consists of anionic monomers.

11. A process as defined in claim 1, further comprising:
cooling the reaction mixture following the polymerization and subsequently diluting the reaction mixture with the second portion of the amount of said potassium polyacrylate dispersing agent B.

12. A process as defined in claim 1, further comprising:
cooling the reaction mixture to $\leq 35°$ C.

13. A process as defined in claim 1, further comprising:
diluting the reaction mixture subsequently with from 5 to 50% of said potassium polyacrylate dispersing agent B by weight, based on the total weight thereof.

14. A water-in-water polymer dispersion obtained as defined in claim 1.

15. The method of claim 1, further comprising:
including the water-in-water polymer dispersion as defined in claim 14 for solid/liquid separation in aqueous systems.

16. The method of claim 1, further comprising:
including the water-in-water polymeric dispersions as defined in claim 14 as an auxiliary in papermaking.

17. The method of claim 1, further comprising:
including the water-in-water polymer dispersion as defined in claim 14 in retention agent systems in papermaking.

18. A process for producing a water-in-water dispersion of one or more at least one finely dispersed, water-soluble and/or water-swellable anionic polymers A dispersed in a continuous aqueous phase, wherein the polymer A comprises one or more anionic monomer units and, optionally, one or more of a non-ionic, amphiphilic, and cationic monomer units and the polymer A has a $M_w$ of $>1.0 \times 10^6$ g/mol and, wherein the aqueous phase of the dispersion comprises polymeric dispersing agent B and said polymeric dispersing agent B consists of potassium polyacrylate having a weight average molecular weight Mw of 65,000-75,000 g/mol, the process comprising:

in a first stage, free radically polymerizing a monomer composition comprising at least the anionic monomer units and, optionally, the non-ionic, amphiphilic, and cationic monomer units in the presence of at least 5% by weight of said potassium polyacrylate dispersing agent B based on the total weight of the dispersion and from 0.9% by weight to 1.5% by weight of an inorganic salt based on the total weight of the dispersion, to form a reaction mixture, and in a second stage, on completion of said radical polymerization, diluting the reaction mixture with a second amount of said potassium polyacrylate dispersing agent B to form the water-in-water dispersion, wherein the anionic monomers are selected from the group consisting of a.) an olefinically unsaturated carboxylic acid, a carboxylic anhydride, a water-soluble alkali metal salt thereof, an alkaline earth metal salt thereof, and an ammonium salt thereof.

19. The process of claim 1, wherein said potassium polyacrylate dispersing agent B is present in an amount of at least 7.06% by weight in the monomer composition subjected to the free radical polymerization.

20. The process of claim 18, wherein said potassium polyacrylate dispersing agent B is present in an amount of at least 7.06% by weight in the monomer composition subjected to the free radical polymerization.

* * * * *